(12) United States Patent
Zhu

(10) Patent No.: US 9,304,282 B2
(45) Date of Patent: Apr. 5, 2016

(54) LENS DRIVING MOTOR

(71) Applicant: Weijun Zhu, Shenzhen (CN)

(72) Inventor: Weijun Zhu, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 0 days.

(21) Appl. No.: 14/340,755

(22) Filed: Jul. 25, 2014

(65) Prior Publication Data

US 2015/0029605 A1 Jan. 29, 2015

(30) Foreign Application Priority Data

Jul. 26, 2013 (CN) ...................... 2013 2 0473971 U

(51) Int. Cl.

| | | |
|---|---|---|
| *G02B 7/02* | (2006.01) | |
| *G02B 15/14* | (2006.01) | |
| *H02K 41/03* | (2006.01) | |
| *G02B 7/08* | (2006.01) | |
| *G02B 7/04* | (2006.01) | |
| *G03B 3/10* | (2006.01) | |
| *H02K 41/035* | (2006.01) | |
| *G02B 7/10* | (2006.01) | |
| *G02B 7/28* | (2006.01) | |
| *H02K 41/02* | (2006.01) | |
| *H02N 2/02* | (2006.01) | |
| *H04N 5/225* | (2006.01) | |
| *H01L 41/08* | (2006.01) | |

(52) U.S. Cl.
CPC .. *G02B 7/08* (2013.01); *G02B 7/02* (2013.01); *G02B 7/022* (2013.01); *G02B 7/04* (2013.01); *G03B 3/10* (2013.01); *H02K 41/0356* (2013.01); *G02B 7/102* (2013.01); *G02B 7/282* (2013.01); *H01L 41/08* (2013.01); *H02K 41/02* (2013.01); *H02N 2/02* (2013.01); *H04N 5/2254* (2013.01)

(58) Field of Classification Search
CPC .......... G02B 7/02; G02B 7/021; G02B 7/022; G02B 7/023; G02B 7/04; G02B 7/08; G02B 7/102; G02B 7/28; G02B 7/282; H02K 41/02; H02K 41/03; H02K 41/0356; G03B 3/02; G03B 3/10; H04N 5/2254; H04N 5/2257; H04N 5/23212; H02N 2/02; H02N 2/026; H02N 2/0065
USPC ................. 359/814, 819, 823, 824, 694–698; 310/323.01, 323.17; 369/44.14–44.16, 369/44.22

See application file for complete search history.

(56) References Cited

U.S. PATENT DOCUMENTS

| | | | | |
|---|---|---|---|---|
| 6,456,444 | B1 * | 9/2002 | Yumiki et al. | 359/696 |
| 7,215,489 | B2 * | 5/2007 | Nakashima et al. | 359/694 |
| 7,457,060 | B2 * | 11/2008 | Paik et al. | 359/824 |
| 7,525,235 | B2 * | 4/2009 | Nakashima et al. | 310/328 |
| 7,595,947 | B2 * | 9/2009 | Lee et al. | 359/824 |
| 7,706,089 | B2 * | 4/2010 | Koc et al. | 359/824 |
| 7,764,449 | B2 * | 7/2010 | Koc et al. | 359/824 |
| 8,358,477 | B2 * | 1/2013 | Hase | 359/824 |

* cited by examiner

*Primary Examiner* — Loha Ben

(74) *Attorney, Agent, or Firm* — IPro, PLLC; Na Xu

(57) ABSTRACT

A focusing motor an enclosure includes: a lens barrel; a lower support; an iron sheet perpendicularly fixed to the lower support; a coil attached to an inner surface of the iron sheet; at least one pair of magnets arranged on an outer side of the barrel along an optic axis of the barrel and parallel to the coil, a magnetic pole of one magnet is opposite to that of an adjacent magnet; a first guide rail disposed on the outer side of the barrel; a second guide rail disposed on an inner side of the lower support and parallel to the first guide rail; and a pulley assembly located between the barrel and the lower support, and movable along the first and second guide rails.

9 Claims, 4 Drawing Sheets

LENS DRIVING MOTOR

FIELD OF THE INVENTION

The present disclosure relates to a lens driving motor that is capable of auto-focusing and has simple structure for improving the optical axis stability.

BACKGROUND OF THE INVENTION

In a conventional mobile phone with a voice motor, optical zooming is achieved by using a lens driving motor to move a spring sheet up and down so as to drive the lens. However, the main problem of this is as follows: shaking displacement (i.e., axis displacement) might occur in the X/Y direction when the spring sheet moves up and down, which is unfavorable for increasing the number of pixels; and moreover, the lens driving motor of this structure is complex in structure and is difficult to be assembled.

SUMMARY OF THE INVENTION

A primary object of the present disclosure is to solve the problem that axis displacement might occur when the spring sheet of a lens driving motor moves up and down.

To achieve the aforesaid objective, the present disclosure provides a lens driving motor, which includes:

an enclosure;

a lens barrel having an optical axis and disposed inside the enclosure;

a lower support for cooperating with the enclosure to receive the lens barrel, and having a base arranged perpendicularly to the optical axis and two sidewalls;

an iron sheet perpendicularly fixed to the lower support;

a coil attached to an inner surface of the iron sheet;

at least one pair of magnets arranged on an outer side of the barrel along the optical axis and parallel to the coil, a magnetic pole of one magnet being opposite to that of an adjacent magnet;

a first guide rail disposed on the outer side of the barrel;

a second guide rail disposed on an inner side of each of the two sidewalls of the lower support and parallel to the first guide rail; and a pulley assembly located between the barrel and the two sidewalls of the lower support, and movable along the first and second guide rails.

The lens driving motor of the present disclosure is capable of auto-focusing and has simple structure for improving the optical axis stability.

DETAILED DESCRIPTION OF THE INVENTION

Figure 1:
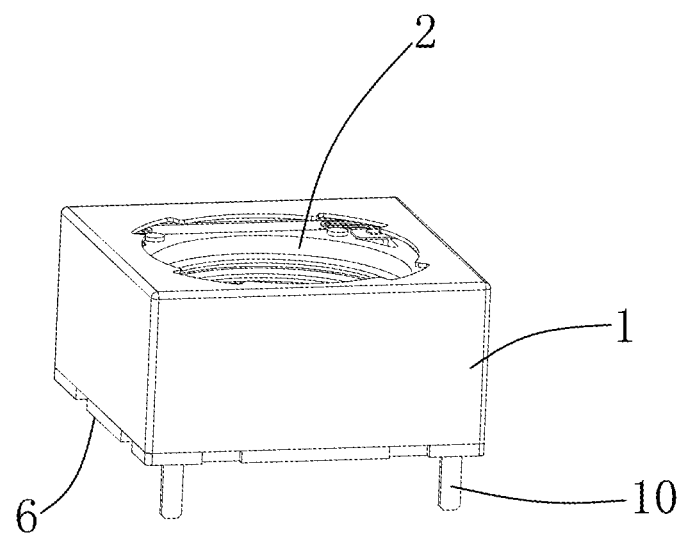
FIG. 1 is an isometric assembled view of a lens driving motor according to an exemplary embodiment of the present disclosure.
Figure 2:
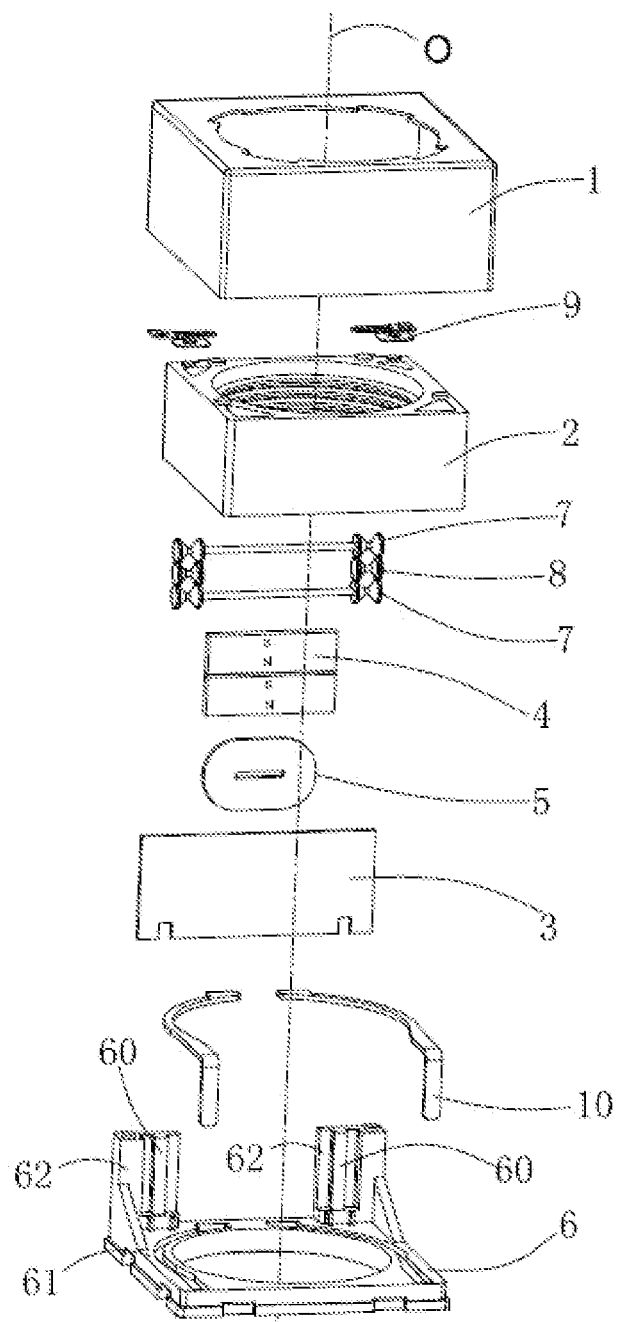
FIG. 2 is an isometric exploded view of the lens driving motor of FIG. 1.
Figure 3:
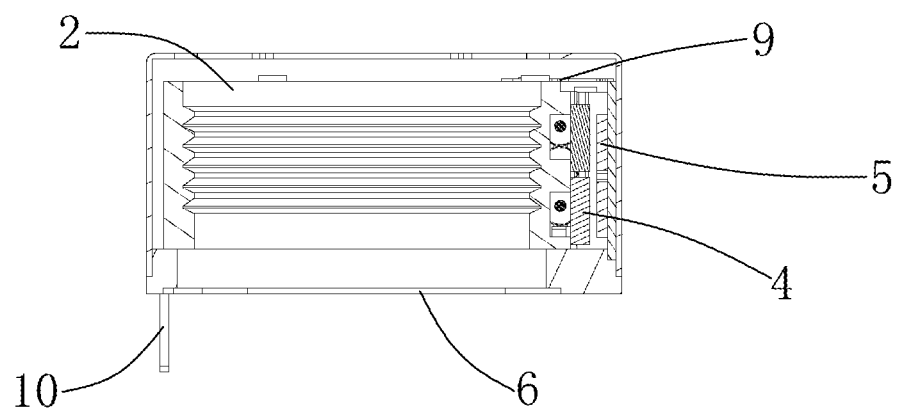
FIG. 3 is a schematic cross-sectional view of the lens driving motor of FIG. 1.
Figure 4:
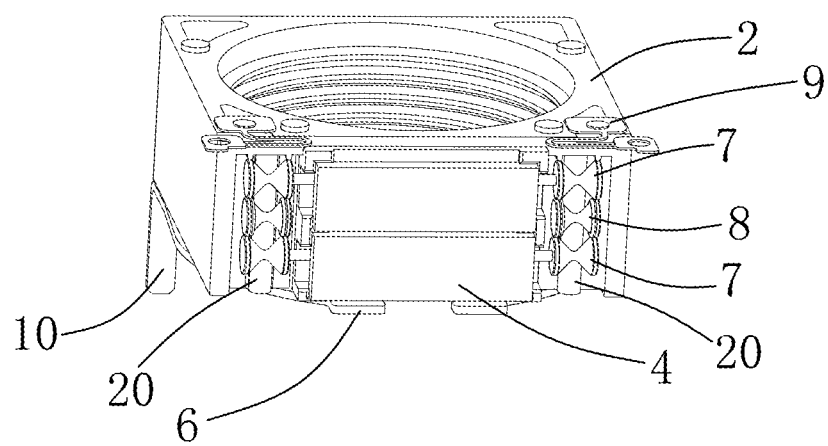
FIG. 4 is a partial perspective assembled structural view of the lens driving motor of FIG. 1.

Referring to FIGS. 1-4, the present disclosure provides a lens driving motor. The lens driving motor may be used in a mobile phone or any other appropriate apparatus that have camera modules. The lens driving motor includes an enclosure 1, a lens barrel 2, an iron sheet 3, at least one pair of magnets 4, a coil 5, a pulley assembly, and a lower support 6.

The iron sheet 3 is vertically fixed to the lower support 6. The coil 5 is fixed on an inner side surface of the iron sheet 3. A first guide rail 20 extending along an optical axis O of the lens barrel 2 is disposed on an outer side of the lens barrel 2. A second guide rail 60 extending along the optical axis O and corresponding to the first guide rail 20 is disposed on an inner side of the lower support 6. The magnets 4 are fixed and spaced apart from each other on an outer side surface of the lens barrel 2 in sequence along the optical axis O, and are disposed parallel to and spaced apart from the coil 5. Adjacent two magnets 4 have opposite magnetic poles. The pulley assembly is located between the lens barrel 2 and the lower support 6 and moves along the first guide rail 20 disposed on the lens barrel 2 and the second guide rail 60 disposed on the lower support 6. When the coil 5 is electrified, the lens barrel 2 moves linearly along the optical axis thereof. When the lens barrel 2 moves linearly along the optical axis thereof, the pulley assembly rolls along the optical axis of the lens barrel 2 at the same time.

Further, the lower support 6 includes a base 61 and two sidewalls 62 that extend vertically and upwards from the base and are spaced apart from each other. The iron sheet 3 is disposed between the sidewalls 62 and fixed to the sidewalls 62. The second guide rail 60 is disposed on the sidewalls 62.

In addition, the pulley assembly includes two pairs of first pulleys 7 and a pair of second pulleys 8. The two pairs of first pulleys 7 and the two pairs of second pulleys 8 are arranged along the optical axis of the lens barrel 2. The two first pulleys 7 of each pair are connected with each other by a connecting link that is perpendicular to the optical axis of the lens barrel 2. The pair of second pulleys 8 is located between the two pairs of first pulleys 7. A rotation direction of the pair of second pulleys 8 is opposite to a rotation direction of the two pairs of first pulleys 7, and an outer diameter of the second pulleys 8 is smaller than an outer diameter of the first pulleys 7.

The coil 5 is attached to the iron sheet 3 by adhesive or other feasible means. The lens driving motor further includes a pair of spring sheets 9 and a pin 10. Each of the spring sheets 9 has one end thereof fixed to an upper surface of the respective sidewall 62 and the other end thereof fixed to a corner of an upper surface of the lens barrel 2 adjacent to the respective sidewall 62. The enclosure 1 and the lower support 6 cooperate to receive the lens barrel 2, the iron sheet 3, the pair of magnets 4, the coil 5 and the pulley assembly therein. The pin 10 for electrically connecting the lens driving motor to an outer circuit is disposed at the bottom of the lower support 6 and extends along a direction away from the lens barrel 2.

The iron sheet 3 is attracted securely by the pair of magnets 4. When the coil 5 is electrified, the pair of magnets 4 cutting magnetic lines of force moves the lens barrel 2 back and forth linearly along the optical axis thereof. At the same time, the first pulleys 7 and the second pulleys 8 also roll back and forth along the optical axis of the lens barrel 2. Thereby, the lens barrel 2 enables the lenses disposed therein to perform optical zooming.

More specifically, the iron sheet 3 is attracted by the pair of magnets 4. The lens barrel 2 contacts with the lower support 6 closely through the pulley assembly. When the coil 5 is electrified, the pair of magnets 4 moves the lens barrel 2 linearly (for example, up and down) along the optical axis of the lens barrel 2. When the lens barrel 2 moves upwards, the two pairs of first pulleys 7 rotate clockwise. At the same time, the pair of second pulleys 8 rotates counterclockwise due to the transmission of the two pairs of first pulleys 7. Since the outer diameter of the second pulleys 8 is smaller than that of the first pulleys 7, the second pulleys 8 will not exert interference friction force on the first and second guide rails 20, 60 of the lens barrel 2 and of the lower support 6, but only roll synchronously following the two pairs of first pulleys 7. In other words, the second pulleys 8 mainly function to prevent the two pairs of first pulleys 7 from contacting with each other and thus from getting stuck, without interfering with the entire mechanism.

Furthermore, when the pair of magnets 4 and the lens barrel 2 move up and down by the two pairs of first pulleys 7 and the pair of second pulleys 8, the spring sheet 9 and the lower support 6 are also subject to a certain pre-pressure.

The lens driving motor of the present disclosure can improve the optical axis stability and is simple in structure and easy to be assembled.

What is claimed is:

1. A lens driving motor, comprising:
   an enclosure;
   a lens barrel having an optical axis and disposed inside the enclosure;
   a lower support for cooperating with the enclosure to receive the lens barrel, and having a base arranged perpendicularly to the optical axis and two sidewalls;
   an iron sheet perpendicularly fixed to the lower support;
   a coil attached to an inner surface of the iron sheet;
   at least one pair of magnets arranged on an outer side of the barrel along the optical axis and parallel to the coil, a magnetic pole of one magnet being opposite to that of an adjacent magnet;
   a first guide rail disposed on the outer side of the barrel;
   a second guide rail disposed on an inner side of each of the two sidewalls of the lower support and parallel to the first guide rail; and
   a pulley assembly located between the barrel and the two sidewalls of the lower support, and movable along the first and second guide rails.

2. The lens driving motor of claim 1, wherein: the two sidewalls extend vertically and upwards from the base and are spaced apart from each other, the iron sheet is disposed between the sidewalls and fixed to the sidewalls, and the second guide rails of the lower support are disposed on the sidewalls.

3. The lens driving motor of claim 2, wherein the lens driving motor further comprises a pair of spring sheets, each of the spring sheets has one end thereof fixed to an upper surface of the respective sidewall and the other end thereof fixed to a corner of an upper surface of the lens barrel adjacent to the respective sidewall.

4. The lens driving motor of claim 1, wherein: the pulley assembly comprises two pairs of first pulleys and a pair of second pulleys, the two pairs of first pulleys and the pair of second pulleys are arranged along the optical axis, and the pair of second pulleys is located between the two pairs of first pulleys.

5. The lens driving motor of claim 4, wherein the two first pulleys of each pair are connected with each other by a connecting link that is perpendicular to the optical axis.

6. The lens driving motor of claim 4, wherein: a rotation direction of the pair of second pulleys is opposite to a rotation direction of the two pairs of first pulleys, and an outer diameter of the second pulleys is smaller than an outer diameter of the first pulleys.

7. The lens driving motor of claim 1, wherein the coil is attached to the iron sheet by adhesive.

8. The lens driving motor of claim 1, wherein when the lens barrel moves linearly along an axial direction thereof, the pulley assembly rolls along the axial direction of the lens barrel at the same time.

9. The lens driving motor of claim 1, wherein the enclosure and the lower support cooperate to receive the lens barrel, the iron sheet, the pair of magnets, the coil and the pulley assembly therein.

* * * * *